Dec. 30, 1947. T. L. JAMES 2,433,367
TRACTION DEVICE
Filed Nov. 14, 1945

INVENTOR.
THOMAS L. JAMES
BY
J. H. Churchr & W. E. Thibodeau
ATTORNEYS

Patented Dec. 30, 1947

2,433,367

UNITED STATES PATENT OFFICE 2,433,367

TRACTION DEVICE

Thomas L. James, Detroit, Mich.

Application November 14, 1945, Serial No. 628,650

6 Claims. (Cl. 152—219)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a traction device and more particularly to a rotating cam or eccentric installed in a special ellipsoidal link in such a manner as to be rotated into various positions to regulate the length of the connection chains whereby the traction device may be adapted to different size wheels.

Heretofore there has been no satisfactory means for regulating the length of connector chains in heavy duty tractive elements, so that slackness in the connector chains between tractive elements could be taken up or more slackness placed in the connector chains as desired under any given operating circumstances.

It is the major object of this invention to provide a traction device with adjustable connector chains between tractive elements so arranged as to provide standard elements each of which would be identical and replaceable in the chain, and thereby making a chain of any desired length practicable, such chain including positive adjustment mechanism of such character that accumulated take-up of some elements would equal or exceed the width of an element.

A further object of the invention is to provide an adjusting shaft and eccentric in an ellipsoidal link that can be locked in one of several positions for maintaining a desired length in the chains circumferentially with respect to the tire, and to generally improve and refine other features, particularly with respect to means for securely mounting the adjusting shaft on the tractive element and to prevent the rotation of the former, which will become apparent as the specification proceeds in conjunction with the annexed drawings.

Figure 2:
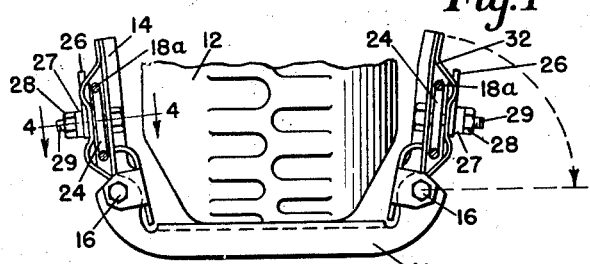
Figure 2 is a detailed end view with parts in section of one of the traction devices.
Figure 4:
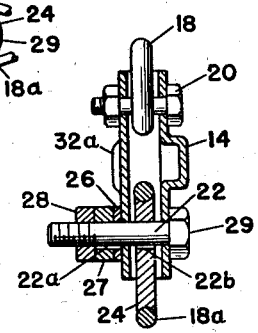
Figure 4 is a cross section on the line 4—4 of Fig. 2.

In accordance with the preferred form of embodiment of my invention the traction device broadly comprises a plurality of traction elements 10 of which a series are adapted to fit around a wheel 12 as shown in Figure 2. Preferably these traction devices have a main body of channel shape, acting as a grouser, and are provided with connector arm portions 14 which may be suitably hinged to the body member as by bolt 16 as will also appear in Figure 2. The connector arm portions 14 are adapted to fold into a generally U-shaped section with the base portion 19 engaging the tread of the tire 12.

In order to make a complete chain, each traction element 10 is connected through the connector arms 14 with the respective adjacent connector arm by chain portions 18. It is the particular construction of this connecting chain portion 18, with its adjustment, that is the principal feature of my invention.

Figure 5:
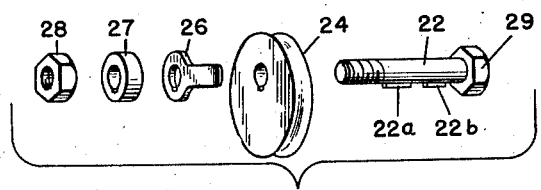
Figure 5 is an exploded view of the eccentric and associated parts.

As is well known, it is essential that the length of the chain portions 18 be made adjustable to permit the appropriate attachment of the traction device to different size tires. For this purpose, I provide a fixed anchor 20 on one device 10 and a suitable adjusting mechanism on the other end of the chain section 18. As particularly shown in Figure 5, the adjusting elements include a shaft element 22 with suitable keys 22a and 22b which shaft is adapted to cooperate with an eccentric or cam 24 also suitably provided with a key-way. In addition I provide a keyed lever 26, collar 27 and nut 28 to permit the rigid assembly and to provide for the appropriate rotation of the eccentric 24.

As shown, each of the chain elements 18 is provided with a special ellipsoidal link 18a which has a large enough portion to receive the cam or eccentric member 24.

It will thus appear that as the shaft 22 is rotated as by a suitable wrench on the head 29, the respective chain length between the adjacent traction elements can be increased or decreased. Preferably the construction is such that in a suitable truck wheel there is enough take-up between the respective elements to make it greater than the distance between traction elements, so that if necessary either one element can be removed or all of the take-ups adjusted.

Figure 1:
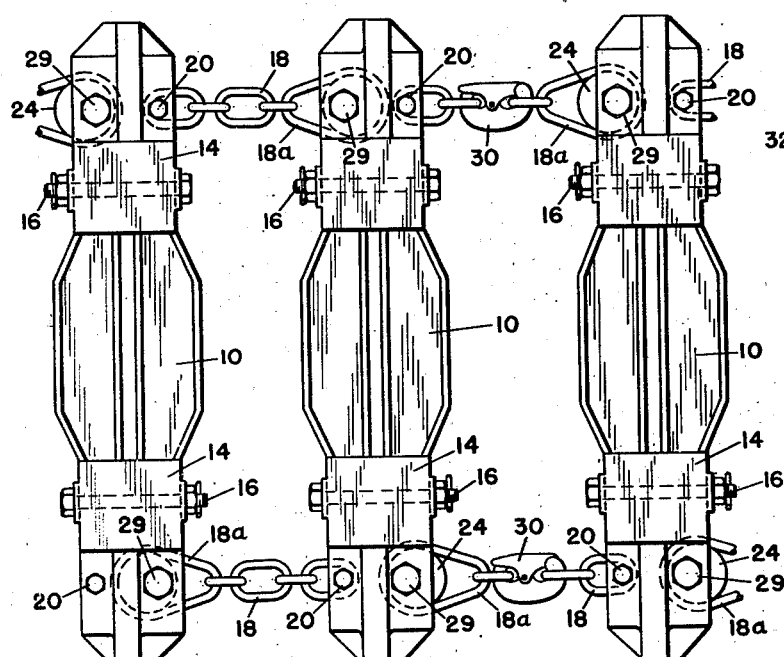
Figure 1 is a top plan view of an assembly of three dual wheel traction devices, showing adjusting eccentrics in full slack adjustment engagement with respect to the right, the lower part of the middle, and the upper part of the left, and in full take-up adjustment engagement with respect to the lower part of the left and the upper part of the middle of the three traction devices as illustrated.

As will appear in Figure 1, each of the traction elements is the same as the adjacent traction element, in that on one end the connector arm has a bolt 20 on one side and the adjustable cam or eccentric 24 on the opposite. On the other connector arm the opposite construction is used. It is, of course, to be understood that the fastening element or lever lock 30 will also be used to make the initial connection in the entire chain element.

Figure 3:
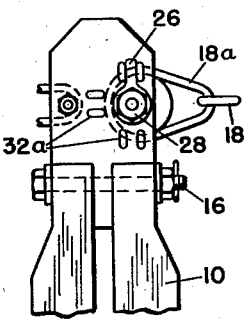
Figure 3 is a partial bottom plan view of a traction device.

In order to prevent the loosening of the adjustment the lever arm 26 extends across a plate member 32 which plate member forms a pocket for the eccentric and the ellipsoidal link 18a. The plate member, however, is suitably formed with projection elements 32a which are angularly spaced so that the lever member 26, as shown in Figure 3, will be held in any desired position.

It is, of course, to be understood that the adjusting device is adaptable to different sizes of traction element and may be of any desired length to fit around the tire or tires to be encompassed. It is also to be understood that the ground shape of the traction element 10 may be varied and that the connecting chain is adaptable to other forms of traction devices but is particularly desirable with the heavy rugged construction necessary for heavy duty trucks and buses. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim is:

1. In a traction device, the combination with tractive elements and connector chains between said tractive elements connecting the latter into a complete chain of an ellipsoidal link in said connector chains, a shaft carried by one of said tractive elements, said shaft extending through said ellipsoidal link and an adjustable eccentric on said shaft disposed within said ellipsoidal link and engaging the latter whereby the effective length of said complete chain may be varied.

2. In a traction device, the combination with tractive elements and connector chains between said traction elements connecting the latter into a complete chain, of one ellipsoidal link carried in each of a plurality of said connector chains, an adjustable eccentric rotatably disposed within each said ellipsoidal link and in cooperative engagement therewith, and rotatable means for adjustably supporting one said eccentric on each of said tractive elements associated with each of said plurality of said connector chains.

3. In a traction device comprising tractive elements and connector arms thereon, the combination of connector chains connecting adjacent connector arms of the tractive elements to form a complete chain of the latter, an ellipsoidal link carried in each of a plurality of said connector chains, each of said ellipsoidal links being disposed adjacent a connector arm, a shaft rotatably supported on each of said connector arms and extending through said adjacent ellipsoidal links, an adjustable eccentric mounted on each said shaft and disposed within said adjacent ellipsoidal link, and means carried by the connector arms for holding the eccentrics in different positions of adjustment thereon.

4. In a traction device comprising tractive elements and connector arms thereon, the combination of connector chains connecting the connector arms of the tractive elements, an ellipsoidal link carried in each of a plurality of said connector chains, each of said ellipsoidal links being disposed adjacent a connector arm, adjustable eccentrics carried by said arms and disposed within the ellipsoidal links associated therewith, a lever for adjusting each of said eccentrics, and a plate member carried by each of said connector arms and extending between the lever and the eccentric associated with the arm, said plate member having angularly spaced depressions for holding said lever and said eccentric in different positions of adjustment.

5. In a traction device comprising tractive elements and connector arms thereon, the combination of connector chains connecting the arms of the tractive elements, an ellipsoidal link carried in each of a plurality of said connector chains, each of said ellipsoidal links being disposed adjacent a connector arm, adjustable eccentrics carried by said arms and disposed within the ellipsoidal links associated therewith, a lever for adjusting each of said eccentrics, and a plate member carried by each of said connector arms and extending between the lever and the eccentric associated with the arm, said plate member having angularly spaced depressions for holding said lever and said eccentric in different positions of adjustment, and means carried by said connector arm for clamping said lever in any of said depressions.

6. A traction device comprising, in combination, a plurality of spaced tractive elements, a pair of connector arms on each of said tractive elements, each of said pair of connector arms being secured on opposite ends of each of said tractive elements, connector chains connecting adjacent connector arms on one end of said tractive elements to form a complete chain, an ellipsoidal link on one end of each of said connector chains, a shaft rotatably supported by each of said connector arms on the respective opposite sides of said pair thereof, an adjustable eccentric mounted on each said shaft and disposed within one said ellipsoidal link engaging the latter, means on the remaining respective opposite sides of each pair of connecting arms for securing the other end of each of said connector chains to one of said connecting arms, and means on said connector arms for holding each said eccentric in positions of adjustment.

THOMAS L. JAMES.

REFERENCES CITED

The following references are of record in the file of this patent:

UNITED STATES PATENTS

| Number | Name | Date |
| --- | --- | --- |
| 1,262,254 | Purvis | Apr. 9, 1918 |
| 1,627,806 | Ross | May 10, 1927 |
| 2,304,318 | Sava | Dec. 8, 1942 |